United States Patent
Kestler

(10) Patent No.: US 12,180,608 B2
(45) Date of Patent: Dec. 31, 2024

(54) FORMING ACOUSTIC PANEL WITH MULTI-LAYERED SEPTUM(S)

(71) Applicant: Rohr, Inc., Chula Vista, CA (US)

(72) Inventor: Steven Kestler, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 334 days.

(21) Appl. No.: 17/688,301

(22) Filed: Mar. 7, 2022

(65) Prior Publication Data

US 2023/0279578 A1 Sep. 7, 2023

(51) Int. Cl.
| | |
|---|---|
| C25D 7/04 | (2006.01) |
| B64C 1/40 | (2006.01) |
| C25D 5/02 | (2006.01) |
| C25D 5/48 | (2006.01) |
| G10K 11/168 | (2006.01) |

(52) U.S. Cl.
CPC ............ *C25D 7/04* (2013.01); *B64C 1/40* (2013.01); *C25D 5/02* (2013.01); *C25D 5/48* (2013.01); *G10K 11/168* (2013.01)

(58) Field of Classification Search
None
See application file for complete search history.

(56) References Cited

U.S. PATENT DOCUMENTS

| | | | | |
|---|---|---|---|---|
| 4,025,681 A | * | 5/1977 | Donnelly | B32B 37/146 |
| | | | | 428/116 |
| 8,607,924 B2 | | 12/2013 | Ichihashi | |
| 9,693,166 B2 | | 6/2017 | Herrera | |
| 10,808,794 B1 | * | 10/2020 | Boyce | F16F 15/02 |
| 2002/0050420 A1 | | 5/2002 | Porte | |
| 2011/0290585 A1 | * | 12/2011 | Allen | G10K 11/16 |
| | | | | 181/294 |
| 2014/0216846 A1 | * | 8/2014 | Hurlin | B64D 29/00 |
| | | | | 156/60 |
| 2019/0063318 A1 | * | 2/2019 | Roach | E04B 1/84 |
| 2019/0112066 A1 | * | 4/2019 | Alonso-Miralles | B32B 3/20 |
| 2019/0270504 A1 | * | 9/2019 | Cedar | B64C 1/066 |
| 2020/0184942 A1 | | 6/2020 | Hakuta | |
| 2021/0375252 A1 | | 12/2021 | Porte | |

FOREIGN PATENT DOCUMENTS

| | | | | | |
|---|---|---|---|---|---|
| DE | 202007004024 | * | 5/2007 | ............ | C25D 17/06 |
| EP | 2844463 B1 | | 12/2017 | | |
| GB | 2061791 B | | 5/1983 | | |

OTHER PUBLICATIONS

English translation WO 2020080151 (Year: 2020).*
English translation WO 2010060381 (Year: 2010).*
EP search report for EP23160600.5 dated Jun. 29, 2023.

* cited by examiner

Primary Examiner — Stefanie S Wittenberg
(74) Attorney, Agent, or Firm — Getz Balich LLC

(57) ABSTRACT

A formation method is provided during which a cellular core is provided. The cellular core includes a plurality of cavities that include a first cavity. Each of the cavities extends through the cellular core. A metal substrate is disposed within the first cavity. The metal substrate is electroplated to form a septum within the first cavity. The septum is bonded to the cellular core.

18 Claims, 8 Drawing Sheets

FORMING ACOUSTIC PANEL WITH MULTI-LAYERED SEPTUM(S)

BACKGROUND

1. Technical Field

This disclosure relates generally to an acoustic panel and, more particularly, to forming a core structure for the acoustic panel.

2. Background Information

An aircraft may include an acoustic panel for attenuating noise. The acoustic panel may be configured as a single-degree of freedom (SDOF) acoustic panel or a multi-degree of freedom (MDOF) acoustic panel; e.g., a double degree of freedom (DDOF) acoustic panel. A multi-degree of freedom acoustic panel may include a plurality of perforated septums, where each of the perforated septums is disposed within a respective cavity of the multi-degree of freedom acoustic panel and separates that cavity into fluidly coupled sub-cavities. Various types and configurations of multi-degree of freedom acoustic panels and septums are known in the art. While these known acoustic panels and septums have various benefits, there is still room in the art for improvement. For example, forming septums using known processes is typically time and labor intensive and thereby increases manufacturing costs of the acoustic panel. There is a need in the art therefore for methods for forming multi-degree of freedom acoustic panels which are less time and/or labor intensive; e.g., formation methods which may be substantially automated.

SUMMARY OF THE DISCLOSURE

According to an aspect of the present disclosure, a formation method is provided during which a cellular core is provided. The cellular core includes a plurality of cavities that include a first cavity. Each of the cavities extends through the cellular core. A metal substrate is disposed within the first cavity. The metal substrate is electroplated to form a septum within the first cavity. The septum is bonded to the cellular core.

According to another aspect of the present disclosure, another formation method is provided during which a cellular core and a metal substrate are provided. The cellular core includes a first cavity that extends through the cellular core. The metal substrate includes one or more perforations. A metal substrate is electroplated to form a septum with one or more perforations. The septum is bonded to a cellular core. The cellular core includes a first cavity that extends through the cellular core. The septum is disposed within the first cavity. An acoustic panel is formed. The acoustic panel includes a core structure between a perforated first skin and a second skin. The core structure includes the cellular core and the septum.

According to still another aspect of the present disclosure, another formation method is provided during which a core structure is provided. The core structure includes a cellular core and a septum. The cellular core includes a first cavity that extends through the cellular core. The septum includes a first metal layer, a second metal layer and one or more perforations extending through the first metal layer and the second metal layer. The septum is disposed within the first cavity and is bonded to the cellular core. The core structure is arranged between a perforated first skin and a second skin. The core structure is bonded to the perforated first skin and the second skin to form an acoustic panel.

The metal substrate may be electroplated while disposed within the first cavity.

The cellular core may be configured as or otherwise include a honeycomb core.

The first cavity may extend along a centerline through the cellular core. The first cavity may have a polygonal cross-sectional geometry in a plane perpendicular to the centerline.

The formation method may also include: attaching the metal substrate to a tool; inserting the tool into the first cavity to dispose the metal substrate within the first cavity; and holding the metal substrate within the first cavity using the tool during the electroplating.

The formation method may also include detaching the tool from the metal substrate subsequent to the bonding of the septum to the cellular core.

The metal substrate may be attached to the tool using a vacuum.

The tool may include a base and a protrusion. The metal substrate may be abutted against the base. The protrusion may project out from the base through a perforation in the metal substrate.

The formation method may also include: disposing the cellular core and the metal substrate into an electroplating bath; and applying an electric charge to the metal substrate to electroplate the metal substrate within the electroplating bath.

The metal substrate may be electrically decoupled from the cellular core within the electroplating bath.

The formation method may also include heating an assembly subsequent to the electroplating to activate bonding material and bond the septum to the cellular core. The assembly may include the cellular core and the septum.

The bonding material may be or otherwise include an adhesive.

The formation method may also include disposing the bonding material with the cellular core prior to disposing the metal substrate within the cavity.

The formation method may also include applying the bonding material to an edge of a wall of the cellular core that at least partially forms the first cavity.

The septum may include one or more perforations.

The first cavity may extend along a centerline through the cellular core. The septum may be angularly offset from the centerline by an acute angle.

The formation method may also include: disposing a second metal substrate within a second cavity, where the cavities include the second cavity; electroplating the second metal substrate to form a second septum within the second cavity; and bonding the second septum to the cellular core.

The formation method may also include forming an acoustic panel. The acoustic panel may include a core structure between a perforated first skin and a second skin. The core structure may include the cellular core and the septum.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
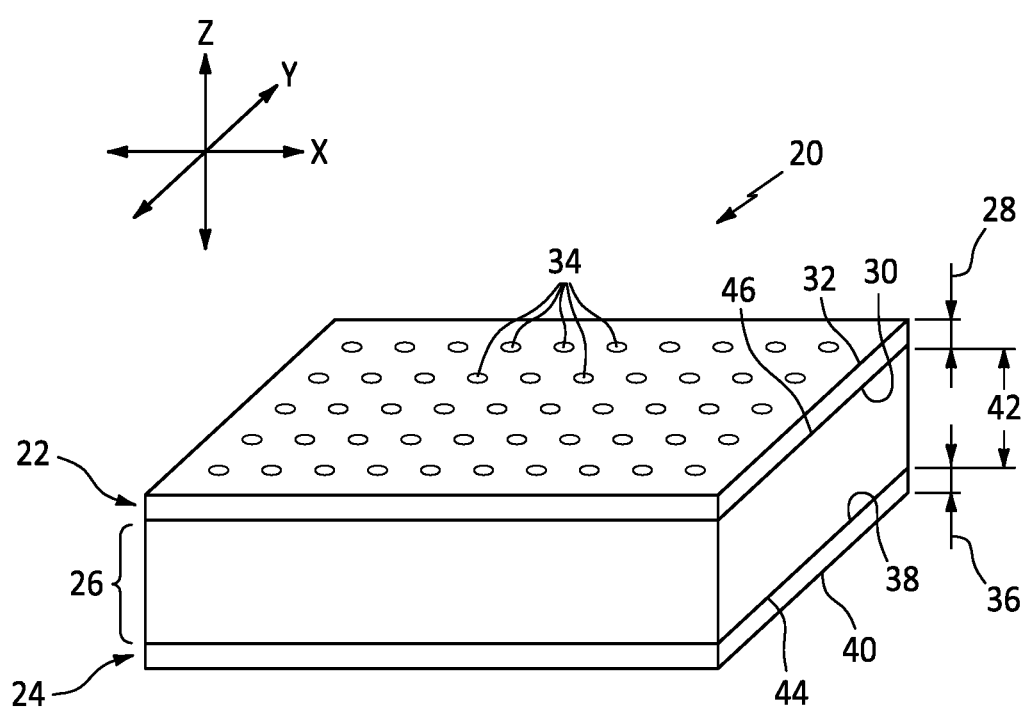
FIG. 1 is a partial perspective schematic illustration of a structural, acoustic panel for attenuating sound.

FIG. 1 is a partial perspective schematic illustration of a structural, acoustic panel 20 for attenuating sound; i.e., noise. This acoustic panel 20 is a multi-degree of freedom (MDOF) acoustic panel; e.g., a double-degree of freedom (DDOF) acoustic panel. The acoustic panel 20 is configured to attenuate sound generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or otherwise included as part of an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related sound other than sound generated by the propulsion system. The acoustic panel 20 of the present disclosure, of course, may alternatively be configured for non-aircraft applications.

The acoustic panel 20 extends laterally in a first lateral direction (e.g., an x-axis direction) along an x-axis. The acoustic panel 20 extends laterally in a second lateral direction (e.g., a y-axis direction) along a y-axis. The acoustic panel 20 extends vertically in a vertical direction (e.g., a z-axis direction) along a z-axis. Note, the term "lateral" may be used herein to generally describe the first lateral direction, the second lateral direction and/or any other direction within the x-y plane. Also note, the term "vertical" may be used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The acoustic panel 20 includes a perforated face skin 22, a solid (e.g., non-perforated) back skin 24 and a core structure 26. This core structure 26 is arranged and extends vertically between the face skin 22 and the back skin 24. The core structure 26 is also connected to the face skin 22 and/or the back skin 24. The core structure 26, for example, may be welded, brazed, fused, adhered or otherwise bonded to the face skin 22 and/or the back skin 24.

The face skin 22 may be a relatively thin sheet or layer of material that extends laterally within the x-y plane. This face skin material may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The face skin 22 has a vertical thickness 28. This face skin vertical thickness 28 extends vertically between opposing side surfaces 30 and 32 of the face skin 22. The face skin 22 includes a plurality of perforations 34; e.g., apertures such as through-holes. Each of these face skin perforations 34 extends generally vertically through the face skin 22 between the face skin side surfaces 30 and 32.

The back skin 24 may be a relatively thin sheet or layer of (e.g., continuous and uninterrupted) material that extends laterally within the x-y plane. This back skin material may be the same as or different than the face skin material. The back skin material, for example, may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The back skin 24 has a vertical thickness 36. This back skin vertical thickness 36 extends vertically between opposing side surfaces 38 and 40 of the back skin 24. The back skin vertical thickness 36 may be equal to or different (e.g., greater or less) than the face skin vertical thickness 28.

The core structure 26 extends laterally within the x-y plane. The core structure 26 has a vertical thickness 42. This core structure vertical thickness 42 extends vertically between opposing sides 44 and 46 of the core structure 26, which core structure sides 44 and 46 are respectively abutted against the interior back skin side surface 38 and the interior face skin side surface 30. The core structure vertical thickness 42 may be substantially greater than the face skin vertical thickness 28 and/or the back skin vertical thickness 36. The core structure vertical thickness 42, for example, may be at least ten to forty times (10-40×), or more, greater than the face skin vertical thickness 28 and/or the back skin vertical thickness 36; however, the acoustic panel 20 of the present disclosure is not limited to such an exemplary embodiment.

Figure 2:
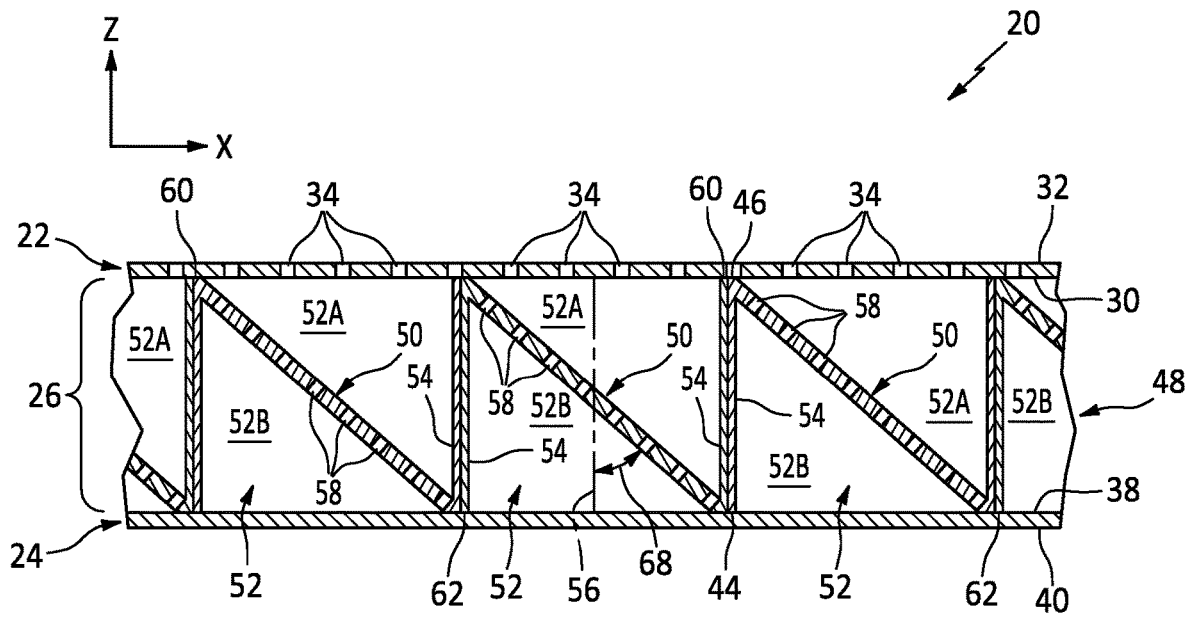
FIG. 2 is a cross-sectional illustration of a portion of the acoustic panel along an x-z plane.
Figure 3:
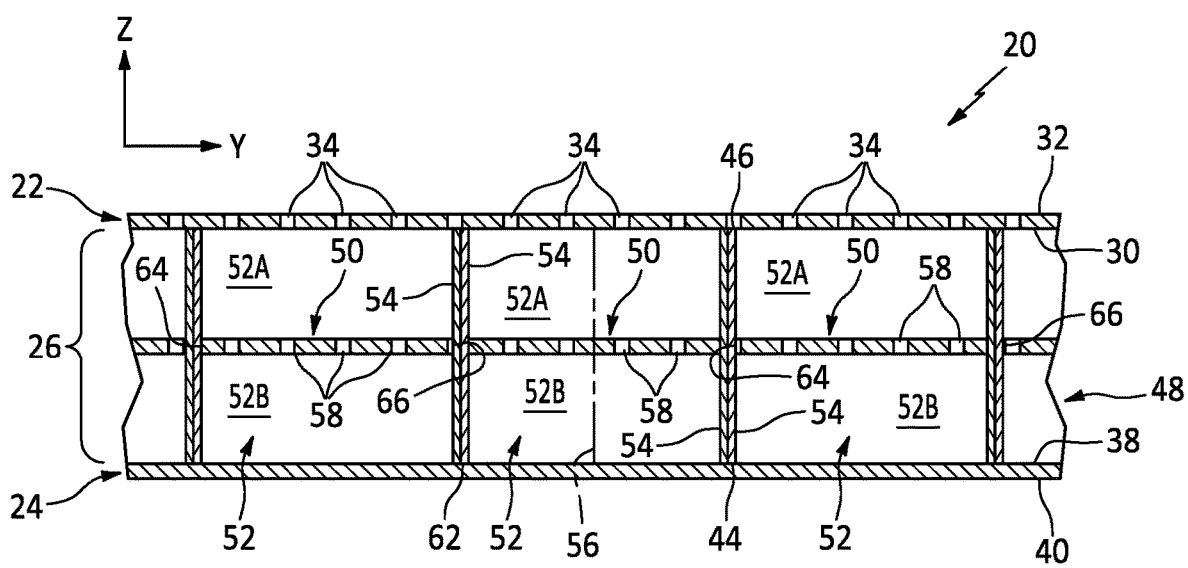
FIG. 3 is a cross-sectional illustration of a portion of the acoustic panel along a y-z panel.

The core structure 26 of FIGS. 2 and 3 includes a cellular core 48 and one or more perforated septums 50. The cellular core 48 is configured to form one or more core cavities 52 (e.g., internal chambers, acoustic resonance chambers, etc.) vertically between the face skin 22 and the back skin 24. The cellular core 48 may be configured as a honeycomb core. The cellular core 48 of FIG. 4, for example, includes a plurality of corrugated sidewalls 54. These corrugated sidewalls 54 are arranged in a side-by-side array and are connected to one another such that each adjacent (e.g., neighboring) pair of the corrugated sidewalls 54 forms an array of the core cavities 52 laterally therebetween. The cellular core 48 and its corrugated sidewalls 54 are constructed from or otherwise include core material such as a metal; e.g., sheet metal. The present disclosure, however, is not limited to such an exemplary core material nor cellular core construction.

Figure 4:
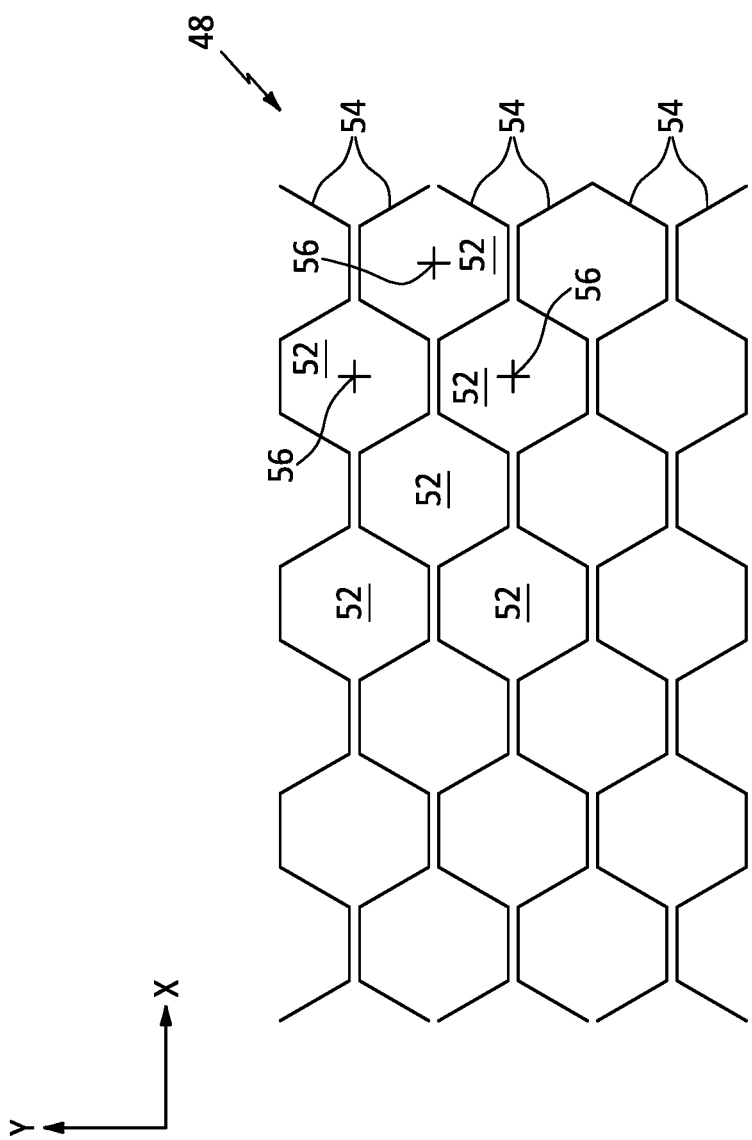
FIG. 4 is an illustration of a portion of a cellular core.

Each of the core cavities 52 of FIGS. 2 and 3 extends vertically within/through the cellular core 48 along a centerline 56 of the respective core cavity 52 between and to the face skin 22 and the back skin 24. One or more or all of the core cavities 52 may thereby each be fluidly coupled with a respective set of one or more of the face skin perforations 34. Referring to FIG. 4, each of the core cavities 52 has a cross-sectional geometry (e.g., shape, size, etc.) when viewed in a reference plane; e.g., a plane perpendicular to the cavity centerline 56 of the respective core cavity 52. This cavity cross-sectional geometry may have a polygonal shape; e.g., a hexagonal shape, a rectangular shape, a triangular shape, etc. The present disclosure, however, is not limited to foregoing exemplary cellular configuration. For example, one or more or all of the core cavities 52 may alternatively each have a circular, elliptical or other non-polygonal cross-sectional geometry. Furthermore, various other types of honeycomb cores and, more generally, various other types of cellular cores for an acoustic panel 20 are known in the art, and the present disclosure is not limited to any particular ones thereof.

Referring to FIGS. 2 and 3, each of the septums 50 is disposed within a respective one of the core cavities 52. Each septum 50 is configured to separate/divide the respective core cavity 52 into a plurality of fluidly coupled sub-cavities 52A and 52B. The face skin sub-cavity 52A extends vertically within the cellular core 48 between and to the face skin 22 and the respective septum 50. The back skin sub-cavity 52B extends vertically within the cellular core 48 between and to the back skin 24 and the respective septum 50. Each septum 50 includes one or more perforations 58; e.g., apertures such as through-holes. Each of these septum perforations 58 extends through the respective septum 50 and thereby fluidly couples the face skin sub-cavity 52A with the back skin sub-cavity 52B.

Each septum 50 of FIGS. 2 and 3 extends laterally across the respective core cavity 52. Each septum 50 of FIG. 2, for example, extends longitudinally between and to a face skin end 60 (e.g., edge) of the respective septum 50 and a back skin end 62 (e.g., edge) of the respective septum 50. The septum face skin end 60 is disposed at (e.g., on, adjacent or proximate) an interface between the face skin 22 and the cellular core 48; e.g., between the face skin 22 and a respective corrugated sidewall 54. This septum face skin end 60 is also bonded to the face skin 22 and/or the cellular core 48 and its respective corrugated sidewall 54. The septum back skin end 62 is disposed at (e.g., on, adjacent or proximate) an interface between the back skin 24 and the cellular core 48; e.g., between the back skin 24 and a respective corrugated sidewall 54. This septum back skin end 62 is also bonded to the back skin 24 and/or the cellular core 48 and its respective corrugated sidewall 54. Each septum 50 of FIG. 3 extends laterally between and to opposing sides 64 and 66 (e.g., edges) of the respective septum 50. The septum first side 64 is disposed at (e.g., on, adjacent or proximate) a first side of the respective core cavity 52; e.g., along one of more of the corrugated sidewalls 54. This septum first side 64 may also be bonded to the cellular core 48 and its respective corrugated sidewall(s) 54. Of course, in other embodiments, the septum first side 64 may be unattached to the cellular core 48 and its respective corrugated sidewall(s) 54. The septum second side 66 is disposed at (e.g., on, adjacent or proximate) a second side of the respective core cavity 52; e.g., along one of more of the corrugated sidewalls 54. This septum second side 66 may also be bonded to the cellular core 48 and its respective corrugated sidewall(s) 54. Of course, in other embodiments, the septum second side 66 may be unattached to the cellular core 48 and its respective corrugated sidewall(s) 54.

Referring to FIG. 2, each of the septums 50 may be canted within the cellular core 48. Each septum 50 of FIG. 2, for example, is angularly offset from the centerline 56 of the respective core cavity 52 in which that septum 50 is disposed by an included angle 68; e.g., an acute angle. This angle 68 may be between ten degrees (10°) and eighty degrees (80°), or between thirty degrees (30°) and sixty degrees (60°); e.g., exactly or about (+/−1°) forty-five degrees (45°). The present disclosure, however, is not limited to the foregoing exemplary angles. Furthermore, in other embodiments, it is contemplated the angle 68 may be exactly or about ninety degrees (90°).

Figure 5:
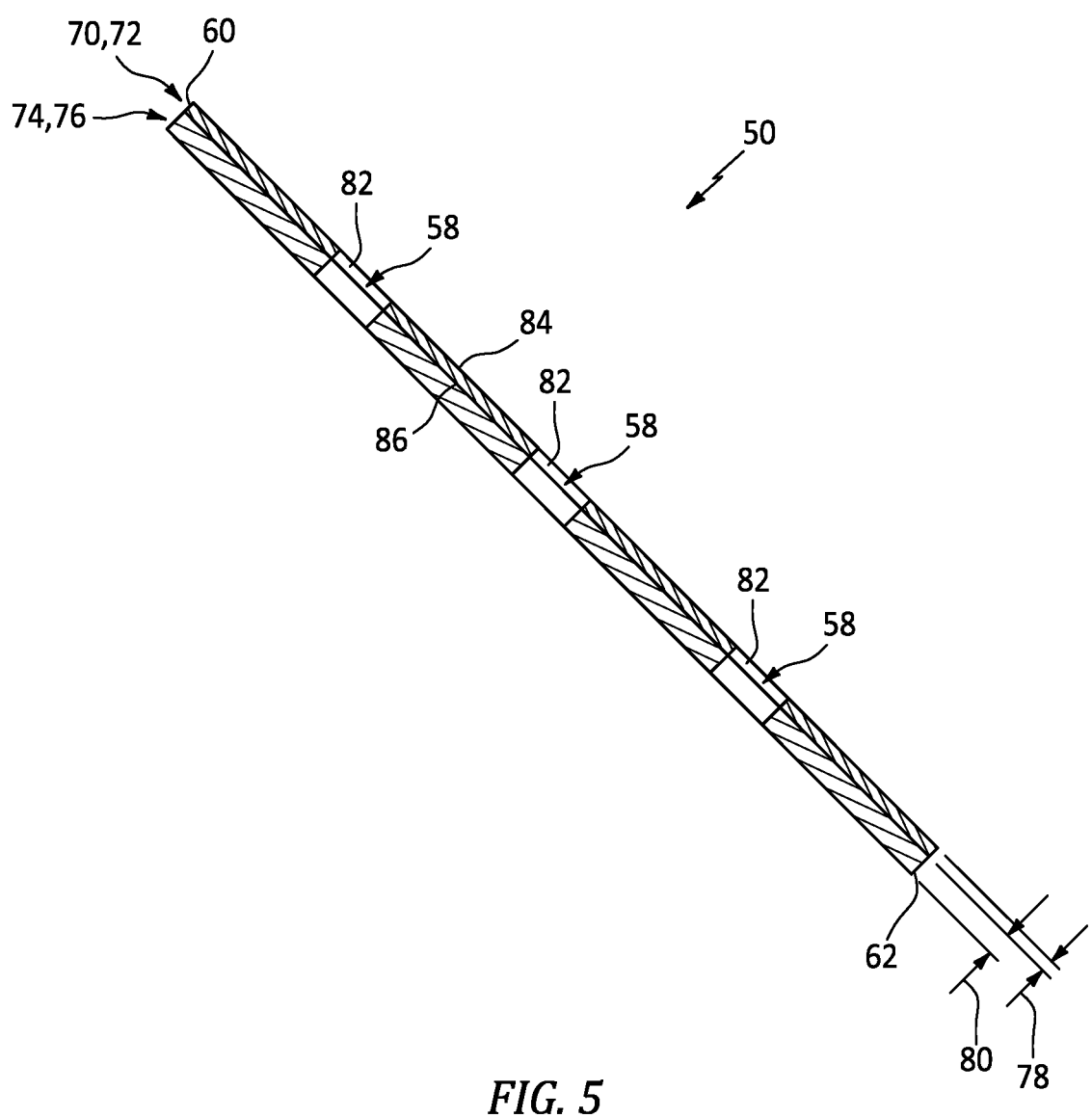
FIG. 5 is a sectional illustration of a perforated septum along the x-z plane.

Referring to FIG. 5, each septum 50 may be configured with a multi-layered construction. The septum 50 of FIG. 5, for example, includes a first layer 70 (e.g., a metal substrate 72) and a second layer 74 (e.g., an electroplated coating 76) disposed on and overlapping (e.g., completely covering) a side of the first layer 70. Each of these layers 70 and 74 may be constructed from metal. The first layer metal, however, may be different than the second layer metal. For example, the first layer metal may be or otherwise include copper (Cu), whereas the second layer metal may be another metal that is compatible with (e.g., which can be electroplated onto) the first layer metal; e.g., the second layer metal may be or otherwise include copper (Cu), nickel (Ni) and/or platinum (Pt). The present disclosure, however, is not limited to any particular septum layer materials or formation techniques.

The first layer 70 has a first layer thickness 78. The second layer 74 has a second layer thickness 80 which may be different (e.g., thicker) than the first layer thickness 78. The first layer 70, for example, may be configured as a thin metal foil substrate and the second layer 74 may be configured as a thick coating that takes on a configuration of and stiffens the first layer 70. The present disclosure, however, is not limited to the foregoing dimensional and/or functional relationship.

The septum perforations 58 of FIG. 5 are collectively formed by the septum layers 70 and 74. Each septum perforation 58, for example, extends through and, thus, is formed by the first layer 70 and the second layer 74 between opposing sides of the respective septum 50.

Figure 6:
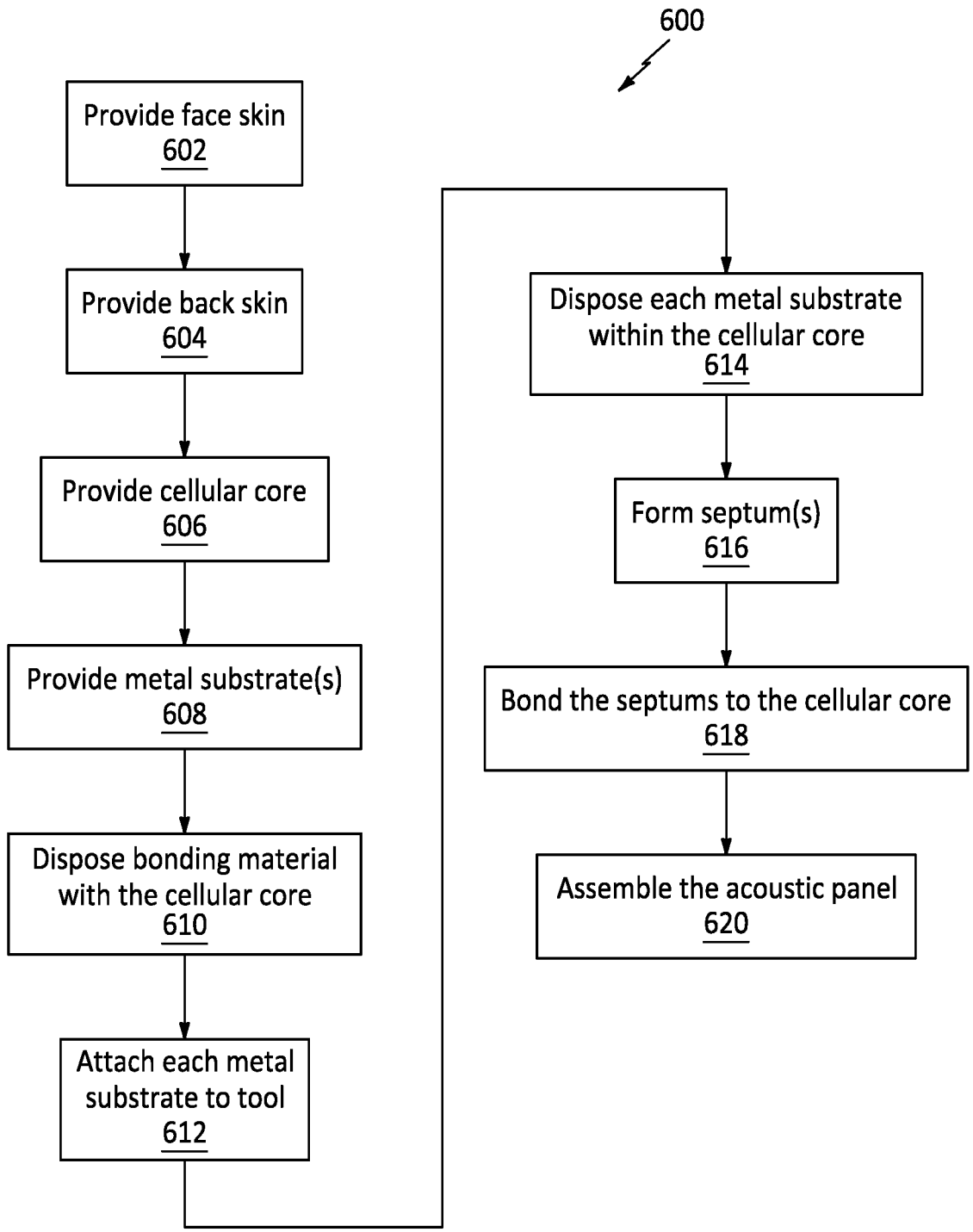
FIG. 6 is a flow diagram of a method for forming an acoustic panel.

FIG. 6 is a flow diagram of a method 600 for forming an acoustic panel. For ease of description, the formation method 600 is described below with reference to the acoustic panel 20 and the acoustic panel components 22, 24 and 26 described above. The formation method 600 of the present disclosure, however, is not limited to forming any particular types or configurations of acoustic panels.

In step 602, the face skin 22 is formed and/or otherwise provided.

In step 604, the back skin 24 is formed and/or otherwise provided.

In step 606, the cellular core 48 is formed and/or otherwise provided.

In step 608, one or more of the metal substrates 72 are formed and/or otherwise provided. Each metal substrate 72 includes one or more perforations 82 (see FIG. 5); e.g., apertures such as through-holes. Each substrate perforation 82 extends through the respective metal substrate 72 between opposing sides 84 and 86 of the metal substrate 72 (see FIG. 5).

Figure 7A:
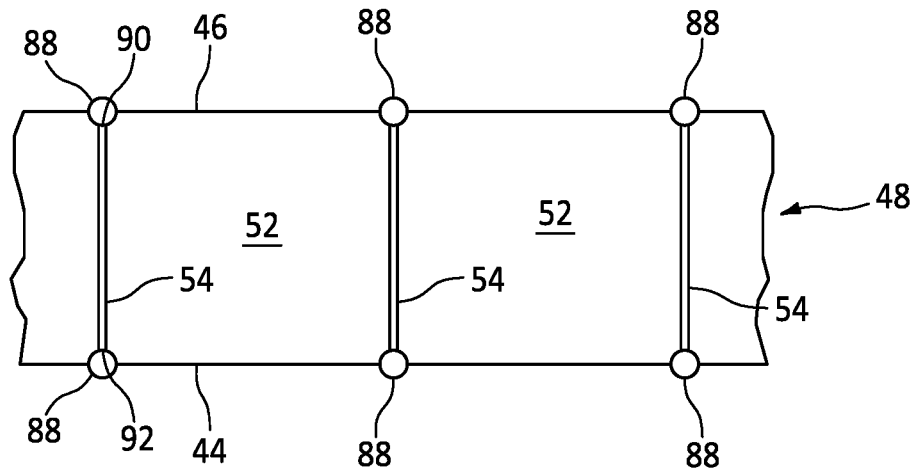
FIGS. 7A and 7B are schematic illustrations of portions of the cellular core configured with bonding material.
Figure 7B:
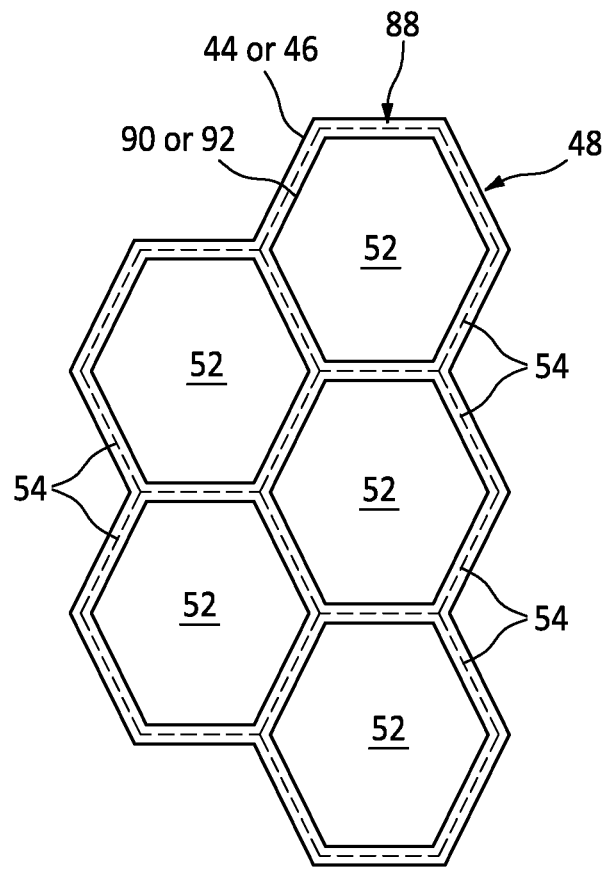

In step 610, bonding material 88 is disposed with the cellular core 48. Referring to FIGS. 7A and 7B, this bonding material 88 may be applied onto one or both of the core structure sides 44 and 46. The bonding material 88 of FIGS. 7A and 7B, in particular, is applied to one or more or all edges 90 and 92 of one or more or all of the corrugated sidewalls 54. Here, each corrugated sidewall 54 extends vertically between and to its respective opposing sidewall edges 90 and 92; e.g., on each wall forming a respective cavity 52. The bonding material 88 may be applied onto an entire length of each respective sidewall edge 90, 92. The bonding material 88 may alternatively be applied onto one or more discrete portions of each respective sidewall edge 90, 92 along its length; e.g., on one or more select walls forming a respective cavity 52. Examples of the bonding material 88 include, but are not limited to, an adhesive (e.g., a heat activated adhesive) and brazing compound.

Figure 8:
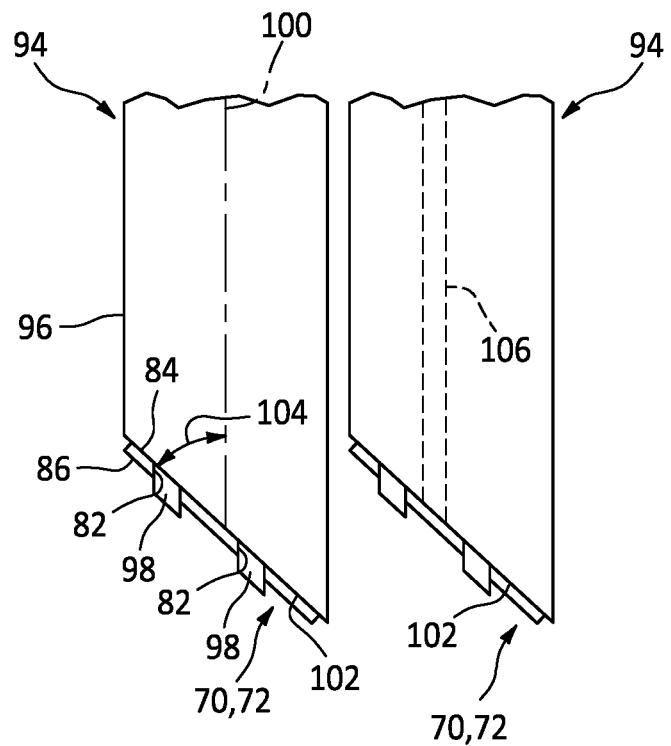
FIG. 8 is a schematic illustration depicting septum formation tools holding a plurality of metal substrates.

In step 612, each metal substrate 72 is attached to a respective septum formation tool 94. The formation tool 94 of FIG. 8 includes a tool base 96 and one or more tool protrusions 98. The tool base 96 extends vertically along a centerline 100 of the respective formation tool 94 to a substrate land 102; e.g., an end surface. The tool centerline 100 may be arranged parallel with (e.g., coaxial with) the cavity centerline 56 of the core cavity 52 (see FIGS. 2 and 3) into which the formation tool 94 is to be inserted. The substrate land 102 of FIG. 8 is angularly offset from the tool centerline 100 by an included angle 104; e.g., an acute angle. This angle 104 is selected to be equal to the angle 68 of FIG. 2. The angle 104 of FIG. 8, for example, may be between ten degrees (10°) and eighty degrees (80°), or between thirty degrees (30°) and sixty degrees (60°); e.g., exactly or about (+/−1°) forty-five degrees (45°). The present disclosure, however, is not limited to the foregoing exemplary angles. Furthermore, in other embodiments, it is contemplated the angle 104 may be exactly or about ninety degrees (90°). Each of the tool protrusions 98 is connected to (e.g., formed integral with) the tool base 96. Each of the tool protrusions 98 projects vertically out from the tool base 96 and its substrate land 102 to a respective distal end.

Each of the tool protrusions 98 may be mated with a respective one of the substrate perforations 82. Each tool protrusion 98 of FIG. 8, for example, projects vertically through a respective one of the substrate perforations 82 so as to partially or completely fill that respective substrate perforation 82. The substrate land 102 is engaged with (e.g., contacts, abutted against, etc.) the exterior side 84 of the respective metal substrate 72. This metal substrate 72 may be attached to the respective formation tool 94 using a vacuum. Fluid (e.g., gas), for example, may be drawn out of a conduit 106 in the formation tool 94 to apply a vacuum and draw the metal substrate 72 against the substrate land 102. The present disclosure, however, is not limited to any particular attachment techniques.

Figure 9:
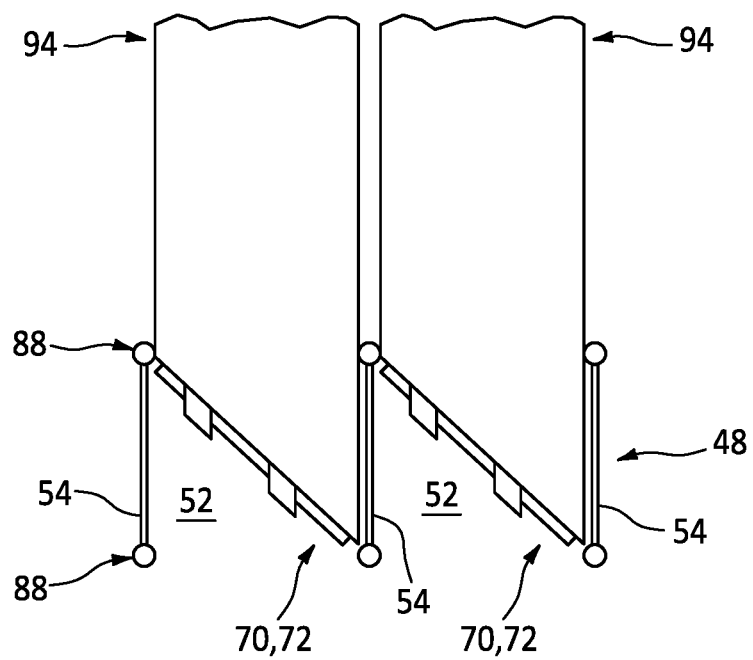
FIG. 9 is a schematic illustration depicting the septum formation tools disposing the metal substrates within a portion of the cellular core.

In step 614, each metal substrate 72 is disposed within the cellular core 48. Each formation tool 94 of FIG. 9, for example, is inserted partially into a respective one of the core cavities 52. The metal substrate 72 attached to each formation tool 94 is thereby also inserted into the respective core cavity 52.

Figure 10:
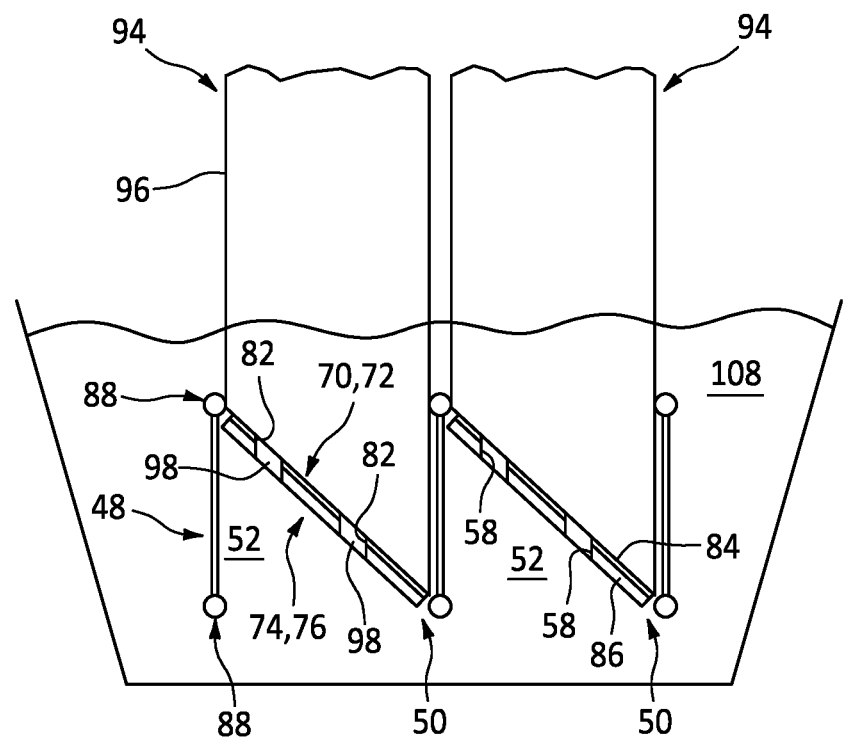
FIG. 10 is a schematic illustration depicting electroplating the metal substrates within an electroplating bath.

In step 616, each metal substrate 72 is electroplated to form a respective septum 50. For example, referring to FIG. 10, an assembly of the cellular core 48, the metal substrates 72 and the formation tools 94 holding and positioning the metal substrates 72 within the cellular core 48 may be disposed (e.g., submerged) into an electroplating bath 108. An electric current may be applied to each of the metal substrates 72 (or a select number of the metal substrates 72) to electrically charge those metal substrates 72 to facilitate an electroplating process. This electroplating process may form the electroplated coating 76 onto at least (or only) the interior side 86 of the metal substrate 72, where the metal substrate 72 (e.g., the first layer 70) and the electroplated coating 76 (e.g., the second layer 74) may collectively form a respective septum 50. Other components (e.g., 48 and 94) of the assembly, however, may not be electroplated. Each metal substrate 72, for example, may be electrically isolated/decoupled from the cellular core 48. Each metal substrate 72, for example, may be (e.g., completely) laterally separated from the cellular core 48 and its corrugated sidewalls 54 by a (e.g., annular) gap. Furthermore, each formation tool 94 (or at least portions of the formation tool 94 exposed to the electroplating bath 108) may be constructed from a non-conductive material.

Figure 11:
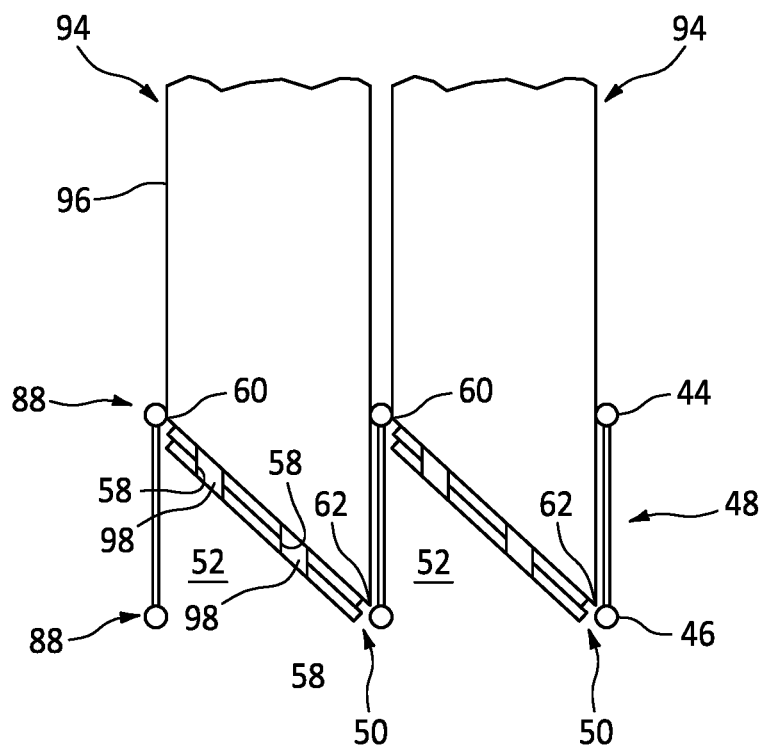
FIG. 11 is a schematic illustration depicting bonding perforated septums to a portion of the cellular core.

In step 618, each septum 50 is bonded to the cellular core 48. For example, referring to FIG. 11, an assembly of the cellular core 48, the septums 50 and the formation tools 94 holding and positioning the septums 50 within the cellular core 48 may be removed from the electroplating bath 108. This assembly may subsequently be heated to an elevated temperature at which the bonding material 88 is melted and/or otherwise activated. This activated bonding material 88 interacts with each septum 50, and bonds the septums 50 to the cellular core 48. The activated bonding material 88 may remain substantially at the core structure sides 44 and 46 so as to bond (e.g., only) the ends 60 and 62 of each septum 50 to the cellular core 48. Alternatively, the activated bonding material 88 may flow along the corrugated sidewalls 54 to as to bond the ends 60 and 62 and the sides 64 and 66 (see FIG. 3) of each septum 50 to the cellular core 48. Following the bonding, each septum 50 may be detached from the respective formation tool 94 (e.g., vacuum suction may be released), and the formation tool 94 may be removed from the cellular core 48 to provide the core structure 26.

In step 620, the acoustic panel 20 is assembly. For example, referring to FIGS. 2 and 3, the core structure 26 is arranged vertically between the face skin 22 and the back skin 24, and the core structure 26 is bonded and/or otherwise attached to the face skin 22 and/or the back skin 24.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A formation method, comprising:
   providing a cellular core, the cellular core comprising a plurality of cavities that include a first cavity, each of the plurality of cavities extending through the cellular core;
   disposing a metal substrate within the first cavity;
   electroplating the metal substrate while the metal substrate is disposed within the first cavity to form a septum within the first cavity;
   bonding the septum to the cellular core; and
   forming an acoustic panel, the acoustic panel comprising a core structure between a perforated first skin and a second skin, and the core structure comprising the cellular core and the septum.

2. The formation method of claim 1, wherein the cellular core comprises a honeycomb core.

3. The formation method of claim 1, wherein
the first cavity extends along a centerline through the cellular core; and
the first cavity has a polygonal cross-sectional geometry in a plane perpendicular to the centerline.

4. The formation method of claim 1, further comprising:
attaching the metal substrate to a tool;
inserting the tool into the first cavity to dispose the metal substrate within the first cavity; and
holding the metal substrate within the first cavity using the tool during the electroplating.

5. The formation method of claim 4, further comprising detaching the tool from the metal substrate subsequent to the bonding of the septum to the cellular core.

6. The formation method of claim 4, wherein the metal substrate is attached to the tool using a vacuum.

7. The formation method of claim 4, wherein
the tool comprises a base and a protrusion;
the metal substrate is abutted against the base; and
the protrusion projects out from the base through a perforation in the metal substrate.

8. The formation method of claim 1, further comprising:
disposing the cellular core and the metal substrate into an electroplating bath; and
applying an electric charge to the metal substrate to electroplate the metal substrate within the electroplating bath.

9. The formation method of claim 8, wherein the metal substrate is electrically decoupled from the cellular core within the electroplating bath.

10. The formation method of claim 1, further comprising heating an assembly subsequent to the electroplating to activate bonding material and bond the septum to the cellular core, the assembly comprising the cellular core and the septum.

11. The formation method of claim 10, wherein the bonding material comprises an adhesive.

12. The formation method of claim 10, further comprising disposing the bonding material with the cellular core prior to disposing the metal substrate within the first cavity.

13. The formation method of claim 10, further comprising applying the bonding material to an edge of a wall of the cellular core that at least partially forms the first cavity.

14. The formation method of claim 1, where the septum comprises one or more perforations.

15. The formation method of claim 1, wherein
the first cavity extends along a centerline through the cellular core; and
the septum is angularly offset from the centerline by an acute angle.

16. The formation method of claim 1, further comprising:
disposing a second metal substrate within a second cavity, the plurality of cavities further including the second cavity;
electroplating the second metal substrate to form a second septum within the second cavity; and
bonding the second septum to the cellular core.

17. A formation method, comprising:
providing a cellular core and a metal substrate, the cellular core comprising a first cavity that extends through the cellular core, and the metal substrate comprising one or more perforations;
electroplating the metal substrate while the metal substrate is disposed within the first cavity to form a septum with one or more perforations;
bonding the septum to the cellular core, the septum disposed within the first cavity; and
forming an acoustic panel, the acoustic panel comprising a core structure between a perforated first skin and a second skin, and the core structure comprising the cellular core and the septum.

18. A formation method, comprising:
forming a core structure comprising a cellular core and a septum, the cellular core comprising a first cavity that extends through the cellular core, the septum comprising a first metal layer, a second metal layer and one or more perforations extending through the first metal layer and the second metal layer, and the septum disposed within the first cavity and bonded to the cellular core;
wherein the forming comprises disposing the first metal layer within the first cavity; and
electroplating the first metal layer while the first metal layer is disposed within
the first cavity to form the septum within the first cavity;
arranging the core structure between a perforated first skin and a second skin; and
bonding the core structure to the perforated first skin and the second skin to form an acoustic panel,
wherein the cellular core comprises a honeycomb core.

* * * * *